(12) United States Patent
Nardacci et al.

(10) Patent No.: US 12,134,012 B2
(45) Date of Patent: Nov. 5, 2024

(54) GOLF BALL AND METHOD OF MAKING SAME

(71) Applicant: Acushnet Company, Fairhaven, MA (US)

(72) Inventors: Nicholas M. Nardacci, Barrington, RI (US); Mark L. Binette, Mattapoisett, MA (US); Brian Comeau, Berkley, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 18/512,132

(22) Filed: Nov. 17, 2023

(65) Prior Publication Data

US 2024/0082646 A1 Mar. 14, 2024

Related U.S. Application Data

(62) Division of application No. 17/372,774, filed on Jul. 12, 2021, now Pat. No. 11,819,739.

(51) Int. Cl.
| | |
|---|---|
| A63B 37/06 | (2006.01) |
| A63B 37/00 | (2006.01) |
| C08J 7/04 | (2020.01) |
| C08J 7/043 | (2020.01) |
| C08L 9/00 | (2006.01) |
| C09D 5/00 | (2006.01) |
| C09D 133/02 | (2006.01) |
| B29C 45/14 | (2006.01) |
| B29L 31/54 | (2006.01) |

(52) U.S. Cl.
CPC ...... *A63B 37/0051* (2013.01); *A63B 37/0061* (2013.01); *A63B 37/00621* (2020.08); *A63B 37/00622* (2020.08); *A63B 37/0063* (2013.01); *A63B 37/0064* (2013.01); *A63B 37/0065* (2013.01); *A63B 37/0066* (2013.01); *A63B 37/0074* (2013.01); *C08J 7/042* (2013.01); *C08J 7/043* (2020.01); *C08L 9/00* (2013.01); *C09D 5/002* (2013.01); *C09D 133/02* (2013.01); *A63B 2209/00* (2013.01); *B29C 45/14311* (2013.01); *B29C 2045/14868* (2013.01); *B29L 2031/546* (2013.01); *C08J 2309/00* (2013.01); *C08J 2433/02* (2013.01)

(58) Field of Classification Search
CPC .. A63B 37/0039; A63B 37/0038; A63B 45/00
See application file for complete search history.

(56) References Cited

U.S. PATENT DOCUMENTS

| | | | |
|---|---|---|---|
| 5,300,325 A | 4/1994 | Nealon et al. | |
| 5,466,424 A | 11/1995 | Kusano et al. | |
| 5,820,488 A | 10/1998 | Sullivan et al. | |
| 5,885,172 A | 3/1999 | Hebert et al. | |
| 5,907,012 A | 5/1999 | Voss et al. | |
| 6,117,025 A | 9/2000 | Sullivan | |
| 6,132,324 A | 10/2000 | Hebert et al. | |
| 6,232,389 B1 | 5/2001 | Feeney et al. | |
| 6,277,921 B1 | 8/2001 | Sullivan | |
| 6,325,731 B1 | 12/2001 | Kennedy, III et al. | |
| 6,398,668 B1 | 6/2002 | Wai | |
| 6,585,607 B2 | 7/2003 | Tzivanis et al. | |
| 6,632,147 B2 | 10/2003 | Cavallaro et al. | |
| 6,838,028 B2 | 1/2005 | Hogge et al. | |
| 6,905,423 B2 | 6/2005 | Morgan et al. | |
| 6,932,720 B2 | 8/2005 | Hogge et al. | |
| 7,004,854 B2 | 2/2006 | Hogge et al. | |
| 7,004,855 B2 | 2/2006 | Jordan | |
| 7,160,954 B2 | 1/2007 | Zieske et al. | |
| 7,182,702 B2 | 2/2007 | Hogge et al. | |
| 7,198,576 B2 | 4/2007 | Sullivan et al. | |
| 7,241,232 B2 | 7/2007 | Sullivan et al. | |
| 7,244,196 B2 | 7/2007 | Kennedy, III et al. | |
| 7,306,528 B2 | 12/2007 | Jordan | |
| 7,338,391 B2 | 3/2008 | Melanson et al. | |
| 7,357,733 B2 | 4/2008 | Hogge et al. | |
| 7,396,300 B2 | 7/2008 | Tzivanis et al. | |
| 7,534,384 B2 | 5/2009 | Tzivanis et al. | |
| 8,303,436 B2 | 11/2012 | Sullivan et al. | |
| 8,454,455 B2 | 6/2013 | Cavallaro | |
| 8,475,881 B1 | 7/2013 | Melanson et al. | |
| 8,907,022 B2 | 12/2014 | Hayes et al. | |
| 9,427,629 B1 | 8/2016 | Binette et al. | |
| 9,504,878 B2 | 11/2016 | Binette et al. | |
| 2003/0069082 A1 | 4/2003 | Sullivan | |
| 2003/0069085 A1 | 4/2003 | Hogge et al. | |
| 2003/0130062 A1 | 7/2003 | Morgan et al. | |
| 2004/0147344 A1 | 7/2004 | Sullivan et al. | |
| 2004/0185963 A1 | 9/2004 | Hogge et al. | |
| 2005/0037866 A1 | 2/2005 | Emerson et al. | |
| 2005/0176523 A1 | 8/2005 | Boehm | |
| 2006/0068938 A1 | 3/2006 | Sullivan | |
| 2006/0128505 A1 | 6/2006 | Sullivan et al. | |
| 2007/0129172 A1 | 6/2007 | Cavallaro | |
| 2008/0064528 A1 | 3/2008 | Jordan | |
| 2008/0261721 A1 | 10/2008 | Hogge et al. | |
| 2009/0143170 A1 | 6/2009 | Ohiria et al. | |
| 2011/0244983 A1 | 10/2011 | Shen et al. | |
| 2013/0165267 A1 | 6/2013 | Molinari | |
| 2013/0324324 A1 | 12/2013 | Ishii et al. | |

*Primary Examiner* — Raeann Gorden

(57) ABSTRACT

Method of making a golf ball, the golf ball comprising a core, an outer layer and at least one adhesion promoting coating disposed between each of the core and the outer layer; the core comprising a rubber composition comprising at least one zinc-containing and/or magnesium-containing component; the outer layer comprising at least one ionomer; and the adhesion promoting coating comprising a waterborne dispersion comprised of at least one ethylene acid copolymer having an acid content of at least 15% by weight wherein the copolymer is at least partially neutralized with one or more neutralizing agent; wherein at least one neutralizing agent is selected from ammonia compounds and/or amine compounds. In a specific embodiment, the at least one neutralizing agent comprises i) mono and/or divalent metal compounds and ii) ammonia compounds and/or amine compounds.

8 Claims, No Drawings

GOLF BALL AND METHOD OF MAKING SAME

CROSS-REFERENCE TO RELATED APPLICATIONS

The present application is a division of U.S. patent application Ser. No. 17/372,774, filed Jul. 12, 2021, the entire disclosure of which is hereby incorporated herein by reference.

FIELD OF THE INVENTION

The field of the invention broadly comprises durable golf balls possessing/displaying excellent adhesion between adjacent layers.

BACKGROUND OF THE INVENTION

Today, both professional and amateur golfers alike use multi-piece, solid golf balls. A single or multi-layered core is encapsulated by at least one layer such as a single or multi-layered cover layer, and optionally one or more intermediate layers may be disposed there between to complete the golf ball construction.

Golf ball manufacturers pre-select the materials for each layer to target and impart desirable golf ball performance properties. Currently, a broad range of options are available for strategically incorporating and coordinating layers within each golf ball construction. In multi-layered golf balls, each of the core, intermediate layer and cover properties, such as hardness, compression, resilience, specific gravity, outer diameter, and thickness, can be preselected and coordinated to target play characteristics such as spin, initial velocity and feel of the resulting golf ball. Meanwhile, golf ball durability remains an important consideration as well. For example, adjacent golf ball layers should display sufficient inter-layer adhesive properties when a golf ball is subjected to the great force and impact of a club face striking the golf ball surface.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY OF THE INVENTION

In golf balls of the invention and the methods of making same, strong adhesion can be achieved between a zinc-containing and/or magnesium-containing rubber-based layer (such as a core) and an ionomeric layer by forming/providing an adhesion promoting coating as defined herein between the two layers.

Such strong inter-layer adhesion can result due at least in part to: i) the water dispersibility of the ethylene acid copolymer of the adhesion promoting coating where the acid content is 15% by weight or higher; ii) strong bonding that results between at least one ethylene acid copolymer of the adhesion promoting coating and the Zn-containing components (such as zinc diacrylate ("ZDA") and/or zinc oxide ("ZnO") and/or magnesium-containing components (such as magnesium diacrylate) of the rubber-based layer; and iii) ion-hopping that occurs between the ethylene acid copolymer(s) of the adhesion promoting coating and the ionomeric material of the outer layer molded thereabout.

Thus, in a preferred embodiment, a golf ball of the invention comprises a core, an outer layer and at least one adhesion promoting coating disposed between the core and the outer layer. The core comprises a rubber composition comprising at least one zinc-containing and/or magnesium-containing component; and the outer layer comprises at least one ionomer. Meanwhile, at least one adhesion promoting coating comprises a waterborne dispersion comprised of at least one ethylene acid copolymer having an acid content of at least 15% by weight; wherein the copolymer is at least partially neutralized with one or more neutralizing agent; wherein at least one neutralizing agent is selected from ammonia compounds and/or amine compounds.

In one embodiment, at least one neutralizing agent comprises an ammonia compound; wherein the ammonia compound comprises ammonium hydroxide.

In another particular embodiment, at least one neutralizing agent comprises an amine compound; wherein the amine compound comprises dicyclohexylamine and/or aminomethylpropanol.

In a specific embodiment, at least one neutralizing agent comprises ammonia compounds or amine compounds; and at least one other neutralizing agent comprises a metal cation source comprising monovalent metal compounds and/or divalent metal compounds selected from zinc (Zn), calcium (Ca), magnesium (Mg), copper (Cu), manganese (Mn), nickel (Ni), cobalt (Co), sodium (Na), potassium (K), lithium (Li), and combinations thereof. In another specific embodiment, the metal cation source consists of divalent metal compounds.

In a different embodiment, at least one neutralizing agent comprises an ammonia compound; at least one other neutralizing agent comprises an amine compound; and at least one additional neutralizing agent comprises a metal cation source selected from monovalent metal compounds and/or divalent metal compounds.

The adhesion promoting coating may contain about 10 wt. % to about 40 wt. % solids. In a particular embodiment, the adhesion promoting coating contains about 10 wt. % to 25 wt. % solids. In yet another embodiment, the adhesion promoting coating contains about 15 wt. % to about 30 wt. % solids. In a different embodiment, the adhesion promoting coating contains greater than 25 wt. % to less than 40 wt. % solids.

The total amount of neutralizing agent included in the adhesion promoting coating is preferably from about 1.50 parts by weight ("pbw") to about 5.5 pbw.

In one embodiment, the adhesion promoting coating has a drying temperature that is above ambient air temperature. In a particular embodiment, the drying temperature is from 120° F. to less than 170° F. In a different embodiment, the adhesion promoting coating has a drying temperature of ambient air temperature.

As used herein, the term "drying temperature" is a physical property of the waterborne dispersion/adhesion promoting coating and refers to the temperature at which the waterborne dispersion/adhesion promoting coating dries sufficiently on the substrate such that that the coated substrate may be transferred or transported such as for forming the outer layer thereabout without disrupting or otherwise damaging the dried waterborne dispersion/adhesion promoting coating. In a particular embodiment, the first adhesion promoting coating has a drying temperature that is above ambient air temperature, while the second adhesion promoting coating has a drying temperature of ambient air temperature.

In a specific embodiment, the metal compound and at least one of the ammonium compound or the amine compound may be included in the dispersion in a ratio of from 0.50:4.0 to 2.0:0.25. In another specific embodiment, the metal compound and the ammonium compound may be included in the dispersion in a ratio of from 0.5:4.0 to 2.0:0.40 and/or the metal compound and the amine compound may be included in the dispersion in a ratio of 1.2:0.25.

In one preferred construction for a golf ball of the invention, the core has a diameter of 1.40 inches to 1.63 inches; a compression of from 10 DCM to 100 DCM; a center hardness of from 20 Shore C to 75 Shore C; a surface hardness of from 40 Shore C to 95 Shore C; and a center hardness that is less than the surface hardness by at least 15 Shore C hardness points. Meanwhile, the adhesion promoting coating is an ethylene acrylic acid dispersion having an acid content of at least 19% by weight; and the outer layer is a casing layer that is comprised of partially or fully-neutralized ionomer material that is neutralized by at least one metal compound selected from the group of Zn, Na, K, Mg, Li, Ca, and combinations thereof. Finally, the golf ball additionally comprises a polyurethane cover layer.

In another preferred construction for a golf ball of the invention, the core comprises a polybutadiene blend of one or more high cis polybutadiene rubbers having a Mooney viscosity of 35 to 70 and synthesized using cobalt, neodymium, or nickel catalyst. The core also has a diameter of 1.47 inches to 1.63 inches; a specific gravity greater than 1.0; a compression of from 10 DCM to 120 DCM; a coefficient of restitution of at least 0.770; a center hardness of from 20 Shore C to 75 Shore C; a surface hardness of from 40 Shore C to 95 Shore C; and a center hardness that is less than the surface hardness by at least 15 Shore C hardness points. Meanwhile, the adhesion promoting coating is an ethylene acrylic acid dispersion having an acid content of at least 22% by weight; and the outer layer is a cover layer comprised of an ionomer material and having a hardness surface hardness of 55D or greater.

It is envisioned that the adhesion promoting coating may be formed or otherwise provided about any golf ball layer that comprises either i) a rubber composition comprising at least one zinc-containing and/or magnesium-containing component or ii) an ionomer material. When the adhesion promoting coating is formed/provided about a golf ball core layer comprising a rubber composition comprising at least one zinc-containing and/or magnesium-containing component, then the outer layer may comprise an ionomer material.

In a specific such embodiment, the outer surface of the core is not surface-treated with any different adhesion promoter; and none of the adhesion promoting coating and the outer layer is surface-treated with any different adhesion promoter at an interface between the adhesion promoting coating and the outer layer.

When the adhesion promoting coating is formed/provided about a golf ball layer comprising an ionomer material, then the outer layer may comprise a rubber composition comprising at least one zinc-containing and/or magnesium-containing component. In this regard, the outer layer may be an intermediate layer (such as an outer core layer, a casing layer or inner cover layer); a coating; a film and/or an outer cover layer. Each ethylene acid copolymer of the adhesion promoting coating has an acid content of at least 15% by weight, or at least 19% by weight, or at least 22% by weight, or at least 30% by weight.

A golf ball of the invention may alternatively include two or more adhesion promoting coatings that are disposed between the core (or other inner layer) and the outer layer. In such embodiments, a first, innermost adhesion promoting coating may be adjacent to the outer surface of the core or other inner layer, while an outermost adhesion promoting coating is adjacent to each of the first adhesion promoting coating and an inner surface of the outer layer.

In a specific such embodiment, a golf ball of the invention has two adhesion promoting coatings wherein a first adhesion promoting coating and a second adhesion promoting coating have at least one differing property. For example, the first adhesion promoting coating and the second adhesion promoting coating may have different drying temperatures. Advantageously, one of the two adhesion promoting coatings has a drying temperature of ambient air temperature while the other adhesion promoting coating has a drying temperature that is elevated-above ambient air drying temperature.

Alternatively, or additionally, the first adhesion promoting coating and the second adhesion promoting coating may have differing wt. % solids contents. For example, the first adhesion promoting coating may contain 25 wt. % to about 40 wt. % solids while the second adhesion promoting coating contains less than 25 wt. % solids. Alternatively, the first adhesion promoting coating may contain 10 wt. % to about 20 wt. % solids while the second adhesion promoting coating contains 25 wt. % to 35 wt. % solids. In a different embodiment, the first adhesion promoting coating may contain 15 wt. % to about 30 wt. % solids while the second adhesion promoting coating contains less than 15 wt. % solids.

The first adhesion promoting coating and the second adhesion promoting coating may also differ as to % neutralization. For example, the first adhesion promoting coating may have 70% or less of acid groups present neutralized, while the second adhesion promoting coating has greater than 70% of acid groups present neutralized. Alternatively, the first adhesion promoting coating may have greater than 70% of acid groups present neutralized, while the second adhesion promoting coating has 70% or less of acid groups present neutralized. In a specific embodiment, the first adhesion promoting coating may have 10%-40% of acid groups present neutralized, while the second adhesion promoting coating has 80%-90% of acid groups present neutralized. In another specific embodiment, the first adhesion promoting coating may have 25%-40% of acid groups present neutralized, while the second adhesion promoting coating has 50%-70% of acid groups present neutralized.

Embodiments are envisioned wherein the zinc-containing and/or magnesium-containing rubber-based layer is an intermediate layer or outer cover layer rather than a core, while the ionomer-containing layer is a core or other inner layer.

The invention also relates to a method of making a golf ball of the invention comprising the steps of: providing a core comprising a rubber composition comprising at least one zinc-containing and/or magnesium-containing component; applying an adhesion promoting coating about an outer surface of the core that consists of a waterborne dispersion comprising at least one ethylene acid copolymer having an acid content of at least 15% by weight; and forming an outer layer about an outer surface of the adhesion promoting coating that comprises at least one ionomer.

The adhesion promoting coating may be dried on the outer surface of the core at ambient temperature before the outer layer is formed about the adhesion promoting coating. Alternatively, the adhesion promoting coating may be dried on the outer surface of the core at an elevated temperature of from 100° F. to 250° F. before the outer layer is formed about the adhesion promoting coating.

In a specific embodiment, at least one neutralizing agent comprises ammonia compounds or amine compounds; and at least one other neutralizing agent comprises a metal cation source comprising monovalent metal compounds and/or divalent metal compounds. In a particular such embodiment, the metal cation source is selected from Zn, Ca, Mg, Cu, Mn, Ni, Co, Na, K, Li, and combinations thereof. In a specific embodiment, the metal cation source consists of divalent metal compounds.

The term "copolymer" is used herein to refer to polymers formed by copolymerization of two or more monomers. Such copolymers include dipolymers consisting essentially of two copolymerized comonomers.

As used herein, the term waterborne dispersion refers to a dispersion wherein water is the solvent used to disperse the resin in the coating.

The terms "disperse," "dispersing" and related terms refer to a process in which solid articles such as pellets of polymer are mixed with water and over a period of time disappear into the liquid phase. The terms "aqueous dispersion" and "dispersion" describe a free-flowing liquid with no solids visible to the human eye.

In general, a method of making a golf ball of the invention may comprise the steps of: providing a first layer comprising a rubber composition comprising at least one zinc-containing and/or magnesium-containing component; applying an adhesion promoting coating about an outer surface of the first layer that consists of a waterborne dispersion comprising at least one ethylene acid copolymer having an acid content of at least 15% by weight; and forming an outer layer comprising at least one ionomer about an outer surface of the adhesion promoting coating.

Embodiments are also envisioned wherein a method of making a golf ball of the invention comprises the steps of: providing a first layer comprising at least one ionomer; applying at least one adhesion promoting coating about and adjacent to an outer surface of the first layer that comprises a waterborne dispersion comprising at least one ethylene acid copolymer having an acid content of at least 15% by weight; and forming an outer layer about an outer surface of the adhesion promoting coating that comprises a rubber composition comprising at least one zinc-containing and/or magnesium-containing component.

DETAILED DESCRIPTION

Advantageously, excellent adhesion may be created between each of a zinc and/or magnesium-containing rubber-based core (or other subassembly or layer) and an adjacent ionomer layer by providing an adhesion promoting coating as defined herein between the two layers. The adhesion promoting coating can create excellent inter-layer adhesion due at least in part to: i) the water dispersibility of the ethylene acid copolymer of the adhesion promoting coating where the acid content is 15% by weight or higher; ii) strong bonding that results between the at least one ethylene acid copolymer of the adhesion promoting coating and the Zn-containing components (such as zinc diacrylate ("ZDA") and/or zinc oxide ("ZnO") and/or magnesium-containing components (such as magnesium diacrylate) of the rubber-based layer; and iii) ion-hopping that occurs between the ethylene acid copolymer(s) of the adhesion promoting coating and the ionomeric material of the outer layer molded thereabout.

A golf ball of the invention may comprise a core and at least one outer layer. The core comprises a rubber composition comprising at least one zinc and/or magnesium-containing component. The outer layer comprises at least one ionomer including partially-neutralized ionomers and highly-neutralized ionomers (HNPs) as well as ionomers formed from blends of two or more partially-neutralized ionomers, blends of two or more highly-neutralized ionomers, and blends of one or more partially-neutralized ionomers with one or more highly-neutralized ionomers.

At least one adhesion promoting coating is disposed between the core and the outer layer and comprises a waterborne dispersion comprised of at least one ethylene acid copolymer having an acid content of at least 15% by weight; wherein the copolymer is at least partially neutralized with one or more neutralizing agent; wherein at least one neutralizing agent is selected from ammonia compounds and/or amine compounds.

In one embodiment, at least one neutralizing agent comprises an ammonia compound; wherein the ammonia compound comprises ammonium hydroxide.

In another particular embodiment, at least one neutralizing agent comprises an amine compound; wherein the amine compound comprises dicyclohexylamine and/or aminomethylpropanol.

In embodiments wherein a single adhesion promoting coating is disposed between the core and the outer layer, the single adhesion promoting coating is adjacent to each of the core and the outer layer.

In embodiments wherein two or more adjacent adhesion promoting coatings are disposed between the core and the outer layer, an innermost adhesion promoting coating is adjacent to the core, while the outermost adhesion promoting coating is adjacent to the outer layer.

And embodiments are envisioned wherein the zinc-containing and/or magnesium-containing rubber-based layer is an outer layer such as an intermediate layer or outer cover layer, while the ionomer-containing layer is a core or other inner layer. In such embodiments, the innermost adhesion promoting coating is adjacent to the ionomer-containing layer, while the outermost adhesion promoting coating is adjacent to the zinc-containing and/or magnesium-containing rubber-based layer.

The ethylene acid copolymer(s) adhere extremely well to ZDA/polybutadiene cores and ionomers and are also water dispersible if the acid content is high enough which allows for application of a thin coating to the core through conventional methods such as spraying, dipping, brushing, rolling, and/or spin coating.

The outer layer can be an intermediate layer (such as an outer core layer, a casing layer or inner cover layer) or an outer cover layer.

The total amount of neutralizing agent included in the adhesion promoting coating may be from about 1.50 pbw to about 5.5 pbw.

In a specific embodiment, the at least one neutralizing agent is selected from ammonia compounds and/or amine compounds. For example, the ammonia compound may be ammonium hydroxide, and the amine compound may be dicyclohexylamine and/or aminomethylpropanol.

In a particular embodiment, the metal compound and at least one of the ammonium compound or the amine compound may be included in the dispersion in a ratio of from 0.50:4.0 to 2.0 to 0.25. In specific embodiments, the metal compound and the ammonium compound may be included in the dispersion in a ratio of from 0.5:4.0 to 2.0:0.40 and/or the metal compound and the amine compound may be included in the dispersion in a ratio of 1.2 to 0.25.

At least one neutralizing agent may comprise a monovalent metal compound such as selected from Na, K, and/or Li, and combinations thereof. At least one neutralizing agent may comprise a divalent metal compound selected from Zn, Ca, Mg, Cu, Mn, Ni, Co, and combinations thereof.

In one embodiment, at least one neutralizing agent comprises ammonia compounds or amine compounds; and at least one other neutralizing agent comprises a metal cation source comprising monovalent metal compounds and/or divalent metal compounds.

In a different embodiment, at least one of the neutralizing agents comprises ammonia compounds; at least one other of the neutralizing agents comprises amine compounds; and at least one additional neutralizing agent comprises a metal cation source comprising monovalent metal compounds and/or divalent metal compounds.

In a specific embodiment, the metal cation source consists of divalent metal compounds.

The adhesion promoting coating may contain about 10 wt. % to about 40 wt. % solids, or 10 wt. % to 25 wt. % solids, or 15 wt. % to 30 wt. % solids, or greater than 25 wt. % to less than 40 wt. % solids.

Improved adhesion between a zinc and/or magnesium-containing rubber-based layer and an adjacent ionomer-containing layer has a direct positive effect on golf ball durability such as by favorably reducing the number of hits it takes before the golf ball is deemed degraded for failure modes such as cracks, breakage and loss of resilience. In this regard, inventive golf balls can be made such as set forth in the following prophetic examples. Golf balls Ex. 1 (single core, adhesion promoting coating and cover), Ex. 2 (single core, adhesion promoting coating and cover), Ex. 3 (single core, adhesion promoting coating and cover), Ex. 4 (single core, adhesion promoting coating, casing, cover) and Ex. 5 (dual core, adhesion promoting coating, casing and cover) of TABLE IVA can be made and compared with corresponding comparative golf balls Comp. Ex. 1, Comp. Ex. 2, Comp. Ex. 3, Comp. Ex. 4 and Comp. Ex. 5 of TABLE IVB (each without any adhesion promoting coating), respectively, in order to demonstrate the improved quality of adhesion between a zinc and/or magnesium-containing rubber-based layer and an adjacent ionomer-containing layer when an adhesion promoting coating as defined herein is provided between the two layers.

Each of inventive golf balls Ex. 1, Ex. 2, Ex. 3, Ex. 4 and Ex. 5 are identical to its corresponding comparative golf ball Comp. Ex. 1, Comp. Ex. 2, Comp. Ex. 3, Comp. Ex. 4 and Comp. Ex. 5, respectively, except that golf balls Ex. 1, Ex. 2, Ex. 3, Ex. 4 and Ex. 5 include an adhesion promoting coating between a zinc-containing rubber-based layer and an ionomer layer, whereas comparative golf balls Comp. Ex. 1, Comp. Ex. 2, Comp. Ex. 3, Comp. Ex. 4 and Comp. Ex. 5 do not include the adhesion promoting coating.

Meanwhile, each golf ball includes a core having one of the formulations set forth in TABLE I, as follows:

TABLE I

| Core Composition | Core Formulations (pbw) | | | | | |
|---|---|---|---|---|---|---|
| | A | B | C | D | E | F |
| Polybutadiene | 100 | 100 | 100 | 100 | 100 | 100 |
| Zinc oxide | 5 | 5 | 5 | 5 | 5 | 5 |
| Zinc diacrylate | 24 | 22.5 | 29.5 | 21.5 | 21.5 | 35 |
| Zinc PCTP | 0.5 | 0 | 0.5 | 0.25 | 0.5 | 0.5 |
| Dicumyl peroxide | 0.8 | 0.6 | 0.6 | | 1 | 1 |
| Trigonox 265 | — | — | — | 0.9 | — | — |
| Barium sulfate | *1 | *1 | *1 | *1 | *1 | *1 |

*1-appropriate amount for a finished golfball weight target of 1.62 oz.

In turn, each golf ball may include a casing layer or cover layer formed from a formulation such as set forth in TABLE II, as follows:

TABLE II

| Cover/Casing Composition/ hardness | Casing Layer and Cover Layer Formulations (pbw) | | | | | |
|---|---|---|---|---|---|---|
| | 1 | 2 | 3 | 4 | 5 | 6 |
| Surlyn ®7940 | | | | | 50 | |
| Surlyn ®8150 | | | 45 | 50 | | |
| Surlyn ®8320 | 40 | | | | | |
| Surlyn ®8940 | | 70 | | | 50 | |
| Surlyn ®9120 | | | 25 | 50 | | |
| Surlyn ®9150 | | | 30 | | | |
| Surlyn ®9910 | | 30 | | | | |
| Surlyn ®9945 | 60 | | | | | |
| Thermoset polyurethane cover | | | | | | 100 |
| Titanium dioxide | 2.5 | 2.5 | 2.5 | | | 2.5 |
| Material Hardness | 59 | 66 | 69 | 69 | 66 | 48 |

Furthermore, each of golf balls Ex. 1, Ex. 2, Ex. 3, Ex. 4 and Ex. 5 may include an adhesion promoting coating comprised of one of the dispersion formulations set forth in TABLE III, as follows:

TABLE III

| Materials | Dispersion Formulations | | | | | | | |
|---|---|---|---|---|---|---|---|---|
| | 1 | 2 | 3 | 4 | 5 | 6 | 7 | 8 |
| Escor ®5200 | | 20 | 20 | 20 | | | 20 | |
| Nucrel ®960 | | | | | 21 | | | |
| Primacor ®5980I | | | | | | 25 | | 25 |
| Michem Prime ®4983 | 100 | | | | | | | |
| Zinc oxide | 1.075 | | | | | | | |
| Potassium hydroxide | | 0.6 | 1.65 | 1.2 | | 1.56 | 1.2 | |
| Sodium hydroxide | | | | | 1.35 | | | |
| ammonium hydroxide (NH4OH) | 3.75 | 1.4 | 0.45 | 1.6 | 0.32 | 0.6 | | 2.6 |

TABLE III-continued

| Materials | Dispersion Formulations | | | | | | | |
|---|---|---|---|---|---|---|---|---|
| | 1 | 2 | 3 | 4 | 5 | 6 | 7 | 8 |
| dicyclohexylamine | 0.25 | | | | | | | |
| aminomethylpropanol (AMP) | | | | | | | 1.0 | |
| Water | 8.75 | 80 | 80 | 80 | 79 | 75 | 80 | 80 |
| % neutralization by metal cation base | 36% | 25% | 70% | 50% | 90% | 40% | 50% | 0% |
| % solids (based on resin level) | 23% | 20% | 20% | 20% | 21% | 25% | 21% | 25% |

Escor ®5200-ethylene acid copolymer, 15 wt. % acrylic acid, melt index 33 g/10'.
Nucrel ®960-ethylene acid copolymer, 15 wt. % methacrylic acid, melt index 60 g/10'.
Primacor ®5980I-ethylene acid copolymer, 20 wt. % acrylic acid, melt index 300 g/10'.
Michem Prime ®4983-ethylene acid co-polymer/21 wt. % acrylic acid functionalized dispersion in ammonia water manuf. by Michelman Inc.

Distinguishably, as stated above, none of corresponding comparative golf ball constructions Comp. Ex. 1, Comp. Ex. 2, Comp. Ex. 3, Comp. Ex. 4 and Comp. Ex. 5 would include an adhesion promoting coating.

TABLE IVA, set forth below, displays the constructions for such inventive golf ball constructions Ex. 1, Ex. 2, Ex. 3, Ex. 4 and Ex. 5 while TABLE IVB displays the constructions for corresponding such comparative golf ball constructions Comp. Ex. 1, Comp. Ex. 2, Comp. Ex. 3, Comp. Ex. 4 and Comp. Ex. 5, respectively:

TABLE IVA

| Layer | Construction | Inventive | | Construction Examples | | |
|---|---|---|---|---|---|---|
| | | Ex1 | Ex2 | Ex3 | Ex4 | Ex5 |
| Inner core | # Core layers | single | single | single | single | double |
| | # Coverlayers | single | single | single | double | double |
| | Composition | A | B | C | D | E |
| | Diameter | 1.575" | 1.55" | 1.56" | 1.51" | 1 |
| | Compression | 30 | 52 | 71 | 43 | 30 |
| | Coefficient | 0.788 | 0.776 | 0.795 | 0.778 | 0.781 |
| | Core Hardness (Shore C) | | | | | |
| | Center hardness | 55 | 57.9 | 63.2 | 65 | 60.1 |
| | Surface hardness | 75.5 | 80.6 | 83.5 | 76 | 66.3 |
| | Core gradient | 20.5 | 22.7 | 20.3 | 11 | 6.2 |
| Outer core | Composition | — | — | — | — | F |
| | Diameter | | | | | 1.55" |
| | Compression | | | | | 87 |
| | Coefficient | | | | | 0.81 |
| | Surface hardness | | | | | 89.1 |
| | Core gradient | | | | | 29 |
| Adhesion promoter Coating | | yes | yes | yes | yes | yes |
| | Adhesive Dispersion Type | 1 | 2 | 5 | 6 | 8 |
| | Coating location | Core surface | Core surface | Core surface | Core surface | Outer Core surface |
| | Application Method | dip | dip | dip | dip | dip |
| | Coating Thickness (mil) | 1 | 1 | 1 | 1 | 1 |
| | Drying Temperature (° F.) | 160 | 160 | 160 | 150 | 150 |

TABLE IVA-continued

|  |  | Inventive | | Construction Examples | | |
| --- | --- | --- | --- | --- | --- | --- |
| Layer | Construction | Ex1 | Ex2 | Ex3 | Ex4 | Ex5 |
| Cased Core | Composition | — | — | — | 4 | 5 |
|  | Size |  |  |  | 1.622 | 1.619 |
|  | Thickness |  |  |  | 0.056" | 0.035" |
|  | Compression |  |  |  | 69 | 97 |
|  | Coefficient |  |  |  | 0.818 | 0.818 |
|  | Surface hardness (Shore D) |  |  |  | 71.5 | 67.9 |
| Cover | Composition | 1 | 2 | 3 | 6 | 6 |
|  | Cover Thickness | 0.055" | 0.068" | 0.062" | 0.030" | 0.032 |
| Ball | Size | 1.682" | 1.683" | 1.68" | 1.682" | 1.683" |
|  | Compression | 51 | 79 | 91 | 82 | 101 |
|  | Coefficient | 0.799 | 0.81 | 0.814 | 0.807 | 0.812 |
|  | Surface hardness (Shore D) | 60.1 | 70.8 | 68.6 | 61.4 | 59.7 |
| Durability test[*1] first failure |  | 127 | 164 | 185 | 206 | 224 |
| Durability test 50% failure |  | 173 | 228 | 277 | 301 | 362 |

[*1] Dual Pendulum Testing Machine Durability (1 dozen balls tested until 50% fail).

TABLE IVB

|  |  | Comparative Construction Examples | | | | |
| --- | --- | --- | --- | --- | --- | --- |
| Layer | Construction | Ex 1 | Ex 2 | Ex 3 | Ex 4 | Ex 5 |
|  | # Core layers | single | single | single | single | double |
|  | # Cover layers | single | single | single | double | double |
| Inner core | Composition | A | B | C | D | E |
|  | Diameter | 1.575" | 1.55" | 1.56" | 1.51" | 1 |
|  | Compression | 30 | 52 | 71 | 43 | 30 |
|  | Coefficient | 0.788 | 0.776 | 0.795 | 0.778 | 0.781 |
|  | Core Hardness (Shore C) |  |  |  |  |  |
|  | Center hardness | 55 | 57.9 | 63.2 | 65 | 60.1 |
|  | Surface hardness | 75.5 | 80.6 | 83.5 | 76 | 66.3 |
|  | Core gradient | 20.5 | 22.7 | 20.3 | 11 | 6.2 |
| Outer core | Composition | — | — | — | — | F |
|  | Diameter |  |  |  |  | 1.55" |
|  | Compression |  |  |  |  | 87 |
|  | Coefficient |  |  |  |  | 0.81 |
|  | Surface hardness |  |  |  |  | 89.1 |
|  | Core gradient |  |  |  |  | 29 |
| Adhesion promoter Coating |  | No | No | No | No | No |
| Cased Core | Composition | — | — | — | 4 | 5 |
|  | Size |  |  |  | 1.622 | 1.619 |
|  | Thickness |  |  |  | 0.056" | 0.035" |
|  | Compression |  |  |  | 69 | 97 |
|  | Coefficient |  |  |  | 0.818 | 0.818 |
|  | Surface hardness (Shore D) |  |  |  | 71.5 | 67.9 |
| Cover | Composition | 1 | 2 | 3 | 6 | 6 |
|  | Cover Thickness | 0.055" | 0.068" | 0.062" | 0.030" | 0.032 |
| Ball | Size | 1.682" | 1.683" | 1.68" | 1.682" | 1.683" |
|  | Compression | 51 | 79 | 91 | 82 | 101 |
|  | Coefficient | 0.799 | 0.81 | 0.814 | 0.807 | 0.812 |
|  | Surface hardness (Shore D) | 60.1 | 70.8 | 68.6 | 61.4 | 59.7 |
| Durability test[*1] first failure |  | 100 | 137 | 165 | 181 | 203 |
| Durability test 50% failure |  | 140 | 176 | 217 | 267 | 329 |

[*1] Dual Pendulum Testing Machine Durability (1 dozen balls tested until 50% fail)

The cores in inventive golf balls Ex. 1, Ex. 2, Ex. 3, Ex. 4 and Ex. 5 of TABLE IVA and comparative golf balls Comp. Ex. 1, Comp. Ex. 2, Comp. Ex. 3, Comp. Ex. 4 and Comp. Ex. 5 of TABLE IVB can be produced by preparing the rubber formulations of TABLE I. Molded cores can be prepared for cover molding via centerless grinding then rinsed and dried.

Dispersion formulation Ex. 1 can be prepared by adding the ingredients at the ratios listed in TABLE III in the following manner. The zinc oxide, dicyclomine, and ammonium hydroxide can be combined into a small jar mill along with alumina ceramic grinding stones and rolled on a roller mill for 10 hours at 50 RPM. The Michem Prime® 4983 (ethylene/21% acrylic acid copolymer dispersion, 25% solids in ammonium water), additional ammonium hydroxide, and water can be added to the mill, and then the contents can be rolled until well dispersed. In dispersion formulation Ex. 1, there is an ammonium and amine cation source as well as a metal cation base of zinc.

Dispersion formulations Ex. 2 through Ex. 8 can be produced as follows. Resin, water and base(s) can be added into a small reactor vessel at the ratios listed in TABLE III. The temperature of the reactor can then be raised and maintained at 120° C. to 150° C. for 3 to 4 hours while the reaction mixture is stirred. After cooling, the dispersions can be collected and filtered for undispersed gel particles if necessary. Dispersion formulations Ex. 2, Ex. 3, Ex. 4, and Ex. 6 use an ammonium containing cation and a metal cation base of potassium, while in dispersion formulation Ex. 5, the metal cation base is sodium. Dispersion formulation Ex. 7 uses an amine containing cation and a potassium metal cation base. Dispersion formulation Ex. 8 uses an ammonium containing cation source without any metal cation base.

The dispersion formulations from TABLE III can then be provided about the inner cores of golf balls Ex. 1, Ex. 2, Ex. 3, and Ex. 4 and about the outer core of golf ball Ex. 5 of TABLE IVA via dipping at room temperature long enough to coat the zinc-containing core/subassembly followed by placing the coated core/subassembly on a drying tray for drying at a temperature of 150° F. to 160° F. for about 1 hour. Meanwhile, no adhesion promoting coating is provided about the corresponding inner cores of comparative golf balls Comp. Ex. 1, Comp. Ex. 2, Comp. Ex. 3, and Comp. Ex. 4 nor about the outer core of corresponding comparative golf ball Comp. Ex. 5.

Subsequently, a cover comprised of the formulations of TABLE II may then be formed about the adhesion promoting coating of golf balls Ex. 1, Ex. 2, and Ex. 3; whereas a cover comprised of the formulations of TABLE II may then be formed directly about the corresponding inner cores of comparative golf balls Comp. Ex. 1, Comp. Ex. 2, Comp. Ex. 3.

Golf balls Ex. 4 and Ex. 5 and corresponding comparative golf balls Comp. Ex. 4 and Comp. Ex. 5 each have casing layer and a cover layer. Thus, a casing layer comprised of the formulations of TABLE II may be formed about the coating of golf balls Ex. 4 and Ex. 5 (see TABLE IVA) via compression molding under heat and pressure to produce two-piece golf balls or cased cores; while a casing layer comprised of the formulations of TABLE II may be formed directly about the uncoated single core of comparative golf ball Comp. Ex. 4 and the outer core layer of Comp. Ex. 5 (see TABLE IVB), respectively. Finally, a thermoset polyurethane outer cover layer can be formed about the cased cores of golf balls Ex. 4 and Ex. 5 of TABLE IVA and the cased cores of comparative golf balls Comp. Ex. 4 and Comp. Ex. 5 of TABLE IVB.

Durability can be established by producing 12 golf balls for each of the golf ball construction groups Ex. 1, Ex. 2, Ex. 3, Ex. 4 and Ex. 5 of TABLE IVA and comparative golf balls groups Comp. Ex. 1, Comp. Ex. 2, Comp. Ex. 3, Comp. Ex. 4 and Comp. Ex. 5 of TABLE IVB and determining (i) first fail (the number of blows it takes for the first golf ball in that group of 12 to fail), and (ii) 50% fail (the number of blows until half the balls (6) of the given group failed.

In this regard, 12 golf balls within each of groups Ex. 1, Ex. 2, Ex. 3, Ex. 4, Ex. 5, Comp. Ex. 1, Comp. Ex. 2, Comp. Ex. 3, Comp. Ex. 4 and Comp. Ex. 5 are produced and repeatedly struck/hit using a Titleist-made Rotating Pendulum Testing Machine. The machine is configured to strike/hit golf balls repeatedly with a grooved-metal face-plate, rotating at 1100 rpm, that is positioned 13.5 inches from the drive motor and angled at approximately 13 degrees. All golf balls can be examined and deemed degraded for failure modes such as cracks, breakage and loss of resilience.

As is shown in TABLE IVA and TABLE IVB, the golf balls of group Ex. 1 have a first failure @hit 127 and a 50% failure @hit 173, whereas the golf balls of corresponding comparative group Comp. Ex. 1 (identical to golf balls Ex. 1 except does not include adhesion promoting coating) have a first failure @hit 100 and a 50% failure @hit 140. Thus, notably, the inventive golf balls of group Ex. 1 have a first failure @27 golf ball hits later than the golf balls of comparative group Comp. Ex. 1 and a 50% failure @33 golf ball hits later than the golf balls of comparative group Comp. Ex. 1.

Turning to the next group, the inventive golf balls of group Ex. 2 have a first failure @hit 164 and a 50% failure @hit 228, whereas the golf balls of corresponding comparative group Comp. Ex. 2 (identical to golf ball Ex. 2 except does not include adhesion promoting coating) have a first failure @hit 137 and a 50% failure @hit 176. Thus, notably, the inventive golf balls of group Ex. 2 have a first failure @27 golf ball hits later than the golf balls of comparative group Comp. Ex. 2 and a 50% failure @52 golf ball hits later than the golf balls of comparative Comp. Ex. 2.

In turn, the inventive golf balls of group Ex. 3 have a first failure @hit 185 and a 50% failure @hit 277, whereas the golf balls of corresponding comparative group Comp. Ex. 3 (identical to golf ball Ex. 3 except does not include adhesion promoting coating) has a first failure @hit 165 and a 50% failure @hit 217. Thus, notably, the inventive golf balls of group Ex. 3 have a first failure @20 golf ball hits later than the golf balls of comparative group Comp. Ex. 3 and a 50% failure @60 golf ball hits later than the golf balls of comparative group Comp. Ex. 3.

Meanwhile, the inventive golf balls of group Ex. 4 have a first failure @hit 206 and a 50% failure @hit 301, whereas the golf balls of corresponding comparative group Comp. Ex. 4 (identical to golf ball Ex. 4 except does not include adhesion promoting coating) have a first failure @hit 181 and a 50% failure @hit 267. Thus, notably, inventive golf balls Ex. 4 have a first failure @25 golf ball hits later than the golf balls of comparative group Comp. Ex. 4 and a 50% failure @34 golf ball hits later than the golf balls of comparative group Comp. Ex. 4.

Finally, the inventive golf balls of group Ex. 5 have a first failure @hit 224 and a 50% failure @hit 362, whereas the corresponding golf balls of comparative group Comp. Ex. 5 (identical to golf ball Ex. 5 except does not include adhesion promoting coating) have a first failure @hit 203 and a 50% failure @hit 329. Thus, notably, inventive golf balls Ex. 5 have a first failure 21 golf ball hits later than the golf balls of comparative group Comp. Ex. 5 and a 50% failure 33 golf ball hits later than the golf balls of comparative group Comp. Ex. 5.

Accordingly, the durability advantage of golf balls of the invention can be demonstrated such as wherein each of inventive golf ball constructions Ex. 1, Ex. 2, Ex. 3, Ex. 4 and Ex. 5 of TABLE IVA has both a first fail and a 50% fail that occurs significantly later in the trial hit sequence than its corresponding comparative golf ball construction Comp. Ex. 1, Comp. Ex. 2, Comp. Ex. 3, Comp. Ex. 4 and Comp. Ex. 5 of TABLE IVB.

The examples provided herein are for illustrative purposes only and should not be construed as limiting the present invention in any way.

A sufficient amount of cation source may be included in the adhesion promoting coating/waterborne dispersion to neutralize a given targeted percent of acid groups present therein. Thus, the total amount of cation source (mono and/or divalent metal(s), ammonium compounds, and amine compounds) and relative amounts of each can be predetermined so as to partially neutralize about 10 to about 70 percent (%) of the acid groups present or highly neutralize greater than about 70 percent (%) of the acid groups present. Embodiments are also envisioned wherein an amount of cation source in excess of that required to neutralize 100% of acid groups present may be included in the adhesion promoting coating/waterborne dispersion.

In specific embodiments, the total amount of neutralizing agent included in the adhesion promoting coating may be from 1.50 pbw to about 5.50 pbw, or from about 1.50 pbw to about 5.50 pbw, or from about 1.75 pbw to about 5.25 pbw, or from about 2.0 pbw to about 5.0 pbw, or from about 2.25 pbw to about 4.75 pbw, or from about 2.50 pbw to about 4.5 pbw, or from about 3.0 pbw to about 4.25 pbw, or from about 3.25 pbw to about 4.0 pbw, or from about 1.50 pbw to about 5.5 pbw, or from about 1.75 pbw to about 5.5 pbw, or from about 2.0 pbw to about 5.5 pbw, or from about 2.5 pbw to about 5.5 pbw, or from about 3.0 pbw to about 5.5 pbw, or from about 3.5 pbw to about 5.5 pbw, or from about 4.0 pbw to about 5.5 pbw, or from about 4.5 pbw to about 5.5 pbw, or from about 1.50 pbw to about 5.0 pbw, or from about 1.50 pbw to about 4.5 pbw, or from about 1.50 pbw to about 4.0 pbw, or from about 1.50 pbw to about 3.5 pbw, or from about 1.50 pbw to about 3.0 pbw, or from about 1.50 pbw to about 2.5 pbw.

Different embodiments are also envisioned wherein the total amount of neutralizing agent included in the adhesion promoting coating is less than 1.50 pbw or greater than 5.5 pbw, or less than about 1.50 pbw or greater than about 5.5 pbw.

The neutralizing agent may include mono and/or divalent metal(s) and ammonium compounds in a ratio of from about 1:3.5 to 4.2:1; or in a ratio of about 1:1; or in a ratio of from about 1:2.6 to 2.6:1.

The neutralizing agent may include mono and/or divalent metal(s) and amine compounds in a ratio of from about 4.3:1 to 1:1.

The neutralizing agent may include mono and/or divalent metal(s) and ammonium compounds and amine compounds such that pbw amine compounds<pbw mono and/or divalent metal(s)<pbw ammonium compounds.

Alternatively, the neutralizing agent may include mono and/or divalent metal(s) and ammonium compounds and amine compounds such that (pbw amine compounds)< (pbw ammonium compounds)< (pbw mono and/or divalent metal(s)).

A golf ball of the invention may include two adhesion promoting coatings that are disposed between the core and the outer layer. A first adhesion promoting coating of the two adjacent adhesion promoting coatings may be adjacent the outer surface of the core, while a second adhesion promoting coating of the two adjacent adhesion promoting coatings is adjacent an inner surface of the outer layer; wherein the first adhesion promoting coating and the second adhesion promoting coating have differing drying temperatures. As used herein, the term "drying temperature" refers to the temperature at which the waterborne dispersion can and does dry on the golf ball substrate onto which it is provided or otherwise applied. In a particular embodiment, the first adhesion promoting coating has a drying temperature that is above ambient air temperature, such as in the range of from 130° F. to less than 170° F., while the second adhesion promoting coating has a drying temperature of ambient air temperature.

It is meanwhile also envisioned that three or more adhesion promoting coatings may be disposed between the core and the outer layer.

In one specific embodiment, the drying temperature that is above ambient air temperature is in the range of from 130° F. to 170° F.

Alternatively, or additionally, the first adhesion promoting coating and the second adhesion promoting coating may have differing % solids contents.

The first and second adjacent adhesion promoting coatings may have different desirable properties and meanwhile display strong adhesive and cohesive strength not only between the first and second adhesion promoting coatings but also between each adhesion promoting coating and the respective layer it is adjacent to. In addition to a drying temperature differential and/or a % solids content differential, there may be a thickness differential, and/or a % neutralization differential, and/or a neutralizing agent type differential as between the first and second adhesion promoting coatings. There may also be a differential between the first and second adjacent adhesion promoting coatings as to normalized moisture vapor transmission rate (nmvtr) such as wherein the nmvtr of the innermost adhesion promoting coating is lower than the nmvtr of the adjacent outer adhesion promoting coating. Normalized moisture vapor transmission rates compare the ability of materials to resist moisture penetration irrespective of the thickness of the material and can be determined by the equation VTR (g·mm/m²·day). (1/thickness (mm)) or g/(m²·day).

Embodiments are also envisioned wherein a portion of one adhesion promoting coating penetrates the surface of an adjacent adhesion promoting coating and embeds therein. This can develop embedded volumes of adhesion promoting coating having properties that are different than the properties of each adhesion promoting coating singly and/or containing a mixture of the differing ingredients of each adhesion promoting coating.

In different embodiments, the adhesion promoting coating may be formed about an ionomeric layer, while the outer layer formed about the adhesion promoting layer is comprised of a zinc and/or magnesium-containing rubber.

The adhesion promoting coating may have a thickness of from about 0.0005 inch to about 0.01 inch, or from 0.0005 inch to 0.01 inch, or from about 0.0010 inch to about 0.01 inch, or from 0.0010 inch to 0.01 inch, or from about 0.0015 inch to about 0.01 inch, or from 0.0015 inch to 0.01 inch, or from about 0.0020 inch to about 0.01 inch, or from 0.0020 inch to 0.01 inch, or from about 0.0025 inch to about 0.01 inch, or from 0.0025 inch to 0.01 inch, or from about 0.0030 inch to about 0.01 inch, or from 0.0030 inch to 0.01 inch, or from about 0.0035 inch to about 0.01 inch, or from 0.0035 inch to 0.01 inch, or from about 0.0040 inch to about 0.01 inch, or from 0.0040 inch to 0.01 inch, or from about 0.0045 inch to about 0.01 inch, or from 0.0045 inch to 0.01 inch, or from about 0.0050 inch to about 0.01 inch, or from 0.0050 inch to 0.01 inch, or from about 0.0055 inch to about 0.01 inch, or from 0.0055 inch to 0.01 inch, or from about 0.0060 inch to about 0.01 inch, or from 0.0060 inch to 0.01 inch, or from about 0.0065 inch to about 0.01 inch, or from 0.0065 inch to 0.01 inch, or from about 0.0070 inch to about 0.01 inch, or from 0.0070 inch to 0.01 inch, or from about 0.0075 inch to about 0.01 inch, or from 0.0075 inch to 0.01 inch, or from about 0.0080 inch to about 0.01 inch, or from 0.0080 inch to 0.01 inch, or from about 0.0085 inch to about 0.01 inch, or from 0.0085 inch to 0.01 inch, or from about 0.0090 inch to about 0.01 inch, or from 0.0090 inch to 0.01 inch, or from about 0.0095 inch to about 0.01 inch, or from 0.0095 inch to 0.01 inch.

In a specific embodiment, the rubber composition may comprise: one or more high cis polybutadiene rubbers having a Mooney viscosity of 35 to 70 and synthesized using cobalt, neodymium, or nickel catalyst and at least one co-agent comprising a metal salt selected from the group consisting of acrylates, diacrylates, methacrylates, and dimethacrylates; wherein the metal is zinc and/or magnesium.

In one embodiment, the co-agent may be included in the rubber composition in an amount of from 1 part to 60 parts by weight per 100 parts of base rubber of the rubber composition.

In a specific embodiment, the rubber composition may comprise zinc pentachlorothiophenol.

For example, the ethylene acid copolymer of the adhesion promoting coating may be selected from the group consisting of ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, and ethylene/(meth)acrylic acid/ethyl (meth)acrylate terpolymers.

Meanwhile, the ionomer may comprise at least one of ethylene/(meth)acrylic acid copolymers or ethylene/(meth) acrylic acid/acrylate terpolymers, wherein at least 10% of the acid groups are neutralized with a metal cation selected from the group consisting of sodium, lithium, magnesium and zinc. In yet another embodiment, at least 15% of the acid groups are neutralized with a metal cation selected from the group consisting of zinc, calcium, magnesium, copper, manganese, and combinations thereof.

Ammonia compounds and amine compounds may also be used to neutralize at least 10% or at least 15% of the acid groups. Examples of ammonia compounds include ammonia ($NH_3$) and/or aqueous ammonia (which is also referred to herein as "ammonium hydroxide" or "ammonia water"). Additional non-limiting examples of neutralizing compounds include primary amines; secondary amines; tertiary amines; diamines; aliphatic polyamines; aldehydes; organic acids; salts of aromatic organic acids; salts of quaternary ammonium compounds; nonaromatic heterocyclic amines; heterocyclic amines; thiols (mercaptans); thiothers; sulfoxides; thiourea and substituted thioureas; substituted thiocarbonyl esters; and combinations thereof.

Examples of primary amines useful in the present invention include n-octylamine; n-decylamine; n-tetradecylamine; n-octadecylamine and cyclohexylamine. Examples of secondary amines useful in the present invention include dibutylamine; diamylamine; di-n-octylamine; 3-isopropylamino-1-butyne; 3-benzylamino-1-butyne; and dicyclohexylamine. Examples of tertiary amines useful in the present invention include tributylamine; tri-n-octylamine; and dipiperidinomethane.

Examples of diamines useful in the present invention include n-hexadecyl propylene diamine and n-dodecyl b-methylene diamine.

When zinc is used, to avoid coagulation, it is desirable to introduce it in the dispersion as an ammonia (or amine) complex preferably in the presence of excess aqueous ammonia (i.e., using an amount of ammonia in excess of the amount that would be needed to neutralize the carboxylic acid groups). Failure to complex the divalent cation prior to contact (i.e., mixing) with the ionomeric resin may cause the mixture to coagulate and form an unusable and inferior coating.

Thus, in order to form the desired divalent metal (preferably divalent zinc oxide)/ammonia complex, the divalent metal oxide (e.g., zinc oxide) is preferably milled, such as ball milled, with a large amount of (i.e., excess) aqueous ammonia (10 to 50 moles of ammonia for each mole of zinc oxide) for several hours, preferably at least 5 hours, at room temperature. The resulting slurry can then be added to ionomer resin which may or may not be pre-dispersed with aqueous ammonia.

Metal cations which can be used to neutralize the resin include divalent metal oxides or hydroxides or simple water-soluble salts such as the acetates, sulfates and nitrates of zinc, calcium, and/or magnesium.

A compound having the desired ammonium ions which can be used to neutralize the resin is ammonia ($NH_3$) or aqueous ammonia (which is also referred to herein as "ammonium hydroxide" or "ammonia water").

The adhesion promoting coating may be dried on an outer surface of the core at ambient temperature before the outer layer is formed about the adhesion promoting coating. Alternatively, the adhesion promoting coating may be dried on the outer surface of the core at an elevated temperature of from 100° F. to 250° F. before the outer layer is formed about the adhesion promoting coating.

The outer layer may be formed about the outer surface of the adhesion promoting coating by injection molding, compression molding and/or casting.

In specific embodiments, the adhesion promoting coating may be applied on the outer surface of the core by at least one of spraying, dipping, brushing, rolling, or spin coating.

In one embodiment, the adhesion promoting coating may be dried on an outer surface of the core at ambient temperature before the outer layer is formed about the adhesion promoting coating.

In another embodiment, the adhesion promoting coating may be dried on the outer surface of the core at an elevated temperature of from 100° F. to 250° F. before the outer layer is formed about the adhesion promoting coating.

In a specific embodiment, the outer surface of the core is not surface-treated with any different adhesion promoter; and none of the adhesion promoting coating and the outer layer is surface-treated with any different adhesion promoter at an interface between the adhesion promoting coating and the outer layer.

In one specific construction of a golf ball of the invention, the core has a diameter of 1.40 inches to 1.63 inches; a compression of from 10 DCM to 100 DCM; a center hardness of from 20 Shore C to 75 Shore C; a surface hardness of from 40 Shore C to 95 Shore C; and a center hardness that is less than the surface hardness by at least 15

Shore C hardness points. Meanwhile, the adhesion promoting coating is an ethylene acrylic acid dispersion having an acid content of at least 19% by weight; and the outer layer is a casing layer that is comprised of partially or fully-neutralized ionomer material that is neutralized by at least one metal compound selected from the group of Zn, Na, K, Mg, Li and Ca, and combinations thereof. Finally, a urethane outer cover layer is cast about an outer surface of the casing layer.

In another specific construction of a golf ball of the invention, the core comprises a polybutadiene blend of one or more high cis polybutadiene rubbers having a Mooney viscosity of 35 to 70 and synthesized using cobalt, neodymium, or nickel catalyst; has: a diameter of 1.47 inches to 1.63 inches; a specific gravity greater than 1.0; a compression of from 10 DCM to 120 DCM; a coefficient of restitution of at least 0.770; a center hardness of from 20 Shore C to 75 Shore C; a surface hardness of from 40 Shore C to 95 Shore C; and a center hardness that is less than the surface hardness by at least 15 Shore C hardness points. Meanwhile, the adhesion promoting coating is an ethylene acrylic acid dispersion having an acid content of at least 22% by weight; while the outer layer is a cover layer comprised of an ionomer material and having a hardness surface hardness of 55D or greater.

In a golf ball of the invention, the outer layer may be formed about the outer surface of the adhesion promoting coating by a molding process selected from the group consisting of injection molding, compression molding and/or casting.

In a particular embodiment, the adhesion promoting coating may penetrate the substrate surface (such as core outer surface being coated), and deposit/embed therein. Alternatively, or additionally, a portion of the adhesion promoting coating may penetrate the inner surface of the outer layer formed thereabout and deposit/embed therein. The depth of penetration of the adhesion promoting coating into either the substrate surface and/or inner surface of the outer layer is preferably less than the thickness of the adhesion promoting coating between the substrate and outer layer.

The invention also relates to a method of making a golf ball of the invention, comprising the steps of: providing a core comprising a rubber composition comprising at least one zinc-containing and/or magnesium-containing component; applying an adhesion promoting coating about and adjacent to an outer surface of the core that comprises a waterborne dispersion comprising at least one ethylene acid copolymer having an acid content of at least 15% by weight; and forming an outer layer comprising at least one ionomer about an outer surface of the adhesion promoting coating. The outer layer may be formed about the outer surface of the adhesion promoting coating by a molding process selected from the group consisting of injection molding, compression molding and/or casting.

In general, a method of making a golf ball of the invention may comprise the steps of: providing a first layer comprising a rubber composition comprising at least one zinc-containing and/or magnesium-containing component; applying an adhesion promoting coating about and adjacent to an outer surface of the first layer that comprises a waterborne dispersion comprising at least one ethylene acid copolymer having an acid content of at least 15% by weight; and forming an outer layer comprising at least one ionomer about an outer surface of the adhesion promoting coating.

Embodiments are also envisioned wherein a method of making a golf ball of the invention comprises the steps of: providing a first layer comprising at least one ionomer; applying an adhesion promoting coating about and adjacent to an outer surface of the first layer that comprises a waterborne dispersion comprising at least one ethylene acid copolymer having an acid content of at least 15% by weight; and forming an outer layer about an outer surface of the adhesion promoting coating that comprises a rubber composition comprising at least one zinc-containing and/or magnesium-containing component.

Once again, the adhesion promoting coating has a thickness of from about to about 0.0005 inch to about 0.01 inch. In another specific embodiment, the core comprises polybutadiene and zinc diacrylate and/or magnesium diacrylate.

And the adhesion promoting coating may be applied on the outer surface of the core by at least one of spraying, dipping, brushing, rolling, or spin coating. In one such embodiment, the adhesion promoting coating may be dried on the outer surface of the core at ambient temperature before the outer layer is formed about the adhesion promoting coating. In another specific embodiment, the adhesion promoting coating may be dried on the outer surface of the core at an elevated temperature of from 100° F. to 250° F. before the outer layer is formed about the adhesion promoting coating.

The adhesion promoting coating may penetrate the substrate surface (such as core outer surface being coated), and deposit/embed therein. In a preferred embodiment, a portion of the adhesion promoting coating becomes embedded/deposited within the substrate to a target depth. The target depth is preferably less than a thickness of the adhesion promoting coating on the surface of the substrate. It is also envisioned that a different portion of the adhesion promoting coating may penetrate the adjacent surface of the surrounding layer formed thereabout.

In another embodiment, the core is comprised of a polybutadiene blend (e.g., 85% Co/Ni/15% Nd), has a diameter of about 1.53 inches and a 16 Shore C hardness gradient (66 Shore C geometric center/82 Shore C surface) and a compression of 75 DCM. The core may be coated with a 19% ethylene acrylic acid dispersion that is applied to the core and surrounded by an ionomer casing (Surlyn®7940/8940) with a urethane cover cast about the casing.

In yet another embodiment, the core comprises a polybutadiene blend (e.g., 85/10/5 PR-040G/Budene1207G/SBR1502) and has a diameter of about 1.575 inches, a 19 Shore C hardness gradient (geometric center 59C/36D; surface 78C/47D), a compression of 65 DCM, a specific gravity of 1.134 g/cm3 and a CoR@125 ft/sec of 0.775. The core may be coated with 22% ethylene acrylic acid sodium ionomer dispersion that is applied to the core and is surrounded by an ionomer blend cover (Surlyn® 8940/9120/9150).

For each embodiment of a golf ball and/or method of the invention disclosed herein, alternative embodiments are indeed also envisioned wherein "comprises" (e.g., "comprise", "comprised of", "comprising", etc.) may be replaced with "consists essentially of" (e.g., "consist essentially of", "consisting essentially of", etc.) and/or "consists of" (e.g., "consist of", "consisting of", etc.).

Embodiments are envisioned wherein the core structure is indeed surface-treated before the adhesion promoting coating is applied or otherwise provided about the core. Such surface-treatment may include mechanically or chemically-abrading the outer surface of the core. For example, the core may be subjected to corona-discharge, plasma-treatment, silane-dipping, or other treatment methods known to those in the art.

Apart from the adhesion promoting coating described herein being formed/positioned between a layer comprising a zinc-containing and/or magnesium-containing rubber-based composition and a layer comprising an ionomeric composition, golf balls of the invention may contain any number of other layers comprising any known composition. For example, such other layers of the golf ball may be formed from thermoset, thermoplastic, castable or non-castable polyurethanes, polyureas, polyurethane/polyurea hybrids, ionomer resins, balata, or any other suitable layer material known to those skilled in the art.

In general, the hardness, diameter, and thickness of the different ball layers may vary depending upon the desired ball construction. Thus, golf balls of the invention may have any known overall diameter and any known number of different layers and layer thicknesses to target desired playing characteristics.

Each of the following co-owned patents/publications is hereby incorporated by reference herein in its entirety: U.S. Pat. Nos. 11,040,250, 10,933,285, 10,596,419, 10,016,659, 10,661,123, 10,967,225, 10,821,327, 10,252,113, 10,918, 912, 10,814,180, 10,773,129, 10,682,553, 10,500,444, 10,500,443, 10,427,004, 10,119,008, 10,105,576, 10,105, 575, 10,933,285, 10,933,285, 10,933,285, 10,933,285, 10,933,285, and U.S. Publ. No. 2021/0094209. For example, non-limiting examples of suitable zinc-containing and/or magnesium-containing rubber-based compositions; ionomeric compositions; and/or other suitable golf ball compositions; as well as non-limiting examples of suitable methods for making golf balls of the invention are disclosed therein.

Test Methods

Hardness. Thermoset and thermoplastic layers herein may be treated in such a manner as to create a positive or negative hardness gradient within and between golf ball layers. In golf ball layers of the present invention wherein a thermosetting rubber is used, gradient-producing processes and/or gradient-producing rubber formulation may be employed. Gradient-producing processes and formulations are disclosed more fully, for example, in U.S. patent application Ser. No. 12/048,665, filed on Mar. 14, 2008; Ser. No. 11/829,461, filed on Jul. 27, 2007; Ser. No. 11/772,903, filed Jul. 3, 2007; Ser. No. 11/832,163, filed Aug. 1, 2007; Ser. No. 11/832,197, filed on Aug. 1, 2007; the entire disclosure of each of these references is hereby incorporated herein by reference. Property gradients such as a hardness gradient can be created between golf ball layers. The center hardness of a core may be obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result.

The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches.

Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

A positive hardness gradient having a magnitude of from about 1 to about 7 Shore C hardness points generally defines a shallow positive hardness gradient. A positive hardness gradient having a magnitude of greater than about 7 to about 22 Shore C hardness points generally defines a "medium" positive hardness gradient. In turn, positive hardness gradient having a magnitude of more than about 22 Shore C hardness points generally defines a "steep" positive hardness gradient.

A hardness gradient having a magnitude within +1 or −1 Shore C hardness point is generally considered to define a "zero" hardness gradient.

And an outer surface hardness (solid inner core/outer core layer) that is less than the respective geometric center hardness/inner surface hardness by more than about 1 Shore C hardness point is generally considered to define a negative hardness gradient.

Thus, the cores and core layers of golf balls of the invention may have various hardnesses and hardness gradients as known in the golf ball art depending on the particular golf ball playing characteristics being targeted. The inner core and/or outer core layer hardness can range, for example, from 35 Shore C to about 98 Shore C, or 50 Shore C to about 90 Shore C, or 60 Shore C to about 85 Shore C, or 45 Shore C to about 75 Shore C, or 40 Shore C to about 85 Shore C.

In other embodiments, inner core and/or outer core layer hardness can range, for example, from about 20 Shore D to about 78 Shore D, or from about 30 Shore D to about 60 Shore D, or from about 40 Shore D to about 50 Shore D, or 50 Shore D or less, or greater than 50 Shore D.

Of course, advantageously, a resulting golf ball of the invention created using the method of the invention may have any known hardness gradient and in any known hardness scale in the golf ball art such as Shore C, Shore D, Shore M, etc.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D hardness) was measured according to the test method ASTM D-2240.

Compression. As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Richle compression, load/deflection measurements at a variety of fixed loads and offsets, and effective modulus.

For purposes of the present invention, compression refers to Soft Center Deflection Index ("SCDI"). The SCDI is a program change for the Dynamic Compression Machine ("DCM") that allows determination of the pounds required to deflect a core 10% of its diameter. The DCM is an apparatus that applies a load to a core or ball and measures the number of inches the core or ball is deflected at measured loads. A crude load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test. The SCDI is a slight variation of this set up. The hardware is the same, but the software and output has changed. With the SCDI, the interest is in the pounds of force required to deflect a core×amount of inches. That amount of deflection is 10% percent of the core diameter. The DCM is triggered, the cylinder deflects the core by 10% of its diameter, and the DCM reports back the pounds of force required (as measured from the attached load cell) to deflect the core by that amount. The value displayed is a single number in units of pounds.

Coefficient of Restitution ("COR"). The COR is determined according to a known procedure, wherein a golf ball or golf ball sub-assembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period ($COR=V_{out}/V_{in}=T_{in}/T_{out}$).

Mooney Viscosity. The measurement of Mooney viscosity is defined according to ASTM D-1646.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

A golf ball of the invention may have any known construction, with the limitation being that the adhesion promoting coating as defined herein is disposed between a zinc-containing and/or magnesium-containing layer and an adjacent ionomeric-based layer. Otherwise, many different types of ball constructions are envisioned, including, for example, a golf ball having two layers with the coating disposed therebetween, a golf ball having a single or multi-layered core, optionally one or more intermediate layers, and a single or multi-layer cover (or even veneer cover construction depending on the type of performance desired of the ball).

The golf balls of the present disclosure may be formed using a variety of application techniques. For example, the golf ball layers may be formed using compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials.

The dimple count on the golf balls contemplated by the present disclosure may be varied. As used herein, the "dimple count" of a golf ball refers to how many dimples are present on the golf ball. The total number of dimples may be based on, for instance, the number of differently sized dimples, the maximum and minimum diameters of the dimples, the dimple arrangement, and the desired surface coverage.

In one embodiment, the total number of dimples may be less than about 350 dimples. For example, the total number of dimples on the golf ball may be about 328. In another embodiment, the total number of dimples on the golf ball may be about 344. In yet another embodiment, the total number of dimples on the golf ball may be about 348. In still another embodiment, the total number of dimples on the golf ball may range from about 350 dimples to about 500 dimples. For instance, the total number of dimples may be about 352 dimples. In an alternative embodiment, the total number of dimples may be about 388 dimples.

The golf balls described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention(s) set forth herein.

What is claimed is:

1. A method of making a golf ball comprising the steps of:
   providing a core formed from a rubber composition comprising at least one zinc-containing and/or magnesium-containing component;
   applying an adhesion promoting coating about an outer surface of the core, wherein the adhesion promoting coating is a waterborne dispersion comprising at least one ethylene acid copolymer having an acid content of at least 15% by weight, wherein the ethylene acid copolymer is at least partially neutralized with dicyclohexylamine and/or aminomethylpropanol; and
   forming an outer layer about an outer surface of the adhesion promoting coating, the outer layer comprising at least one ionomer.

2. The method of claim 1, wherein the adhesion promoting coating contains about 15 wt % to about 30 wt % solids.

3. The method of claim 1, wherein the total amount of neutralizing agent included in the adhesion promoting coating is from about 1.50 pbw to about 5.50 pbw.

4. The method of claim 1, wherein from 10% to 40% of the acid groups of the acid copolymer are neutralized.

5. A method of making a golf ball comprising the steps of:
   providing a core formed from a rubber composition comprising at least one zinc-containing and/or magnesium-containing component;
   applying an adhesion promoting coating about an outer surface of the core, wherein the adhesion promoting coating is a waterborne dispersion comprising at least one ethylene acid copolymer having an acid content of at least 15% by weight, wherein the ethylene acid copolymer is at least partially neutralized with a first neutralizing agent selected from ammonia compounds and amine compounds and a second neutralizing agent selected from monovalent metal compounds and divalent metal compounds of zinc, calcium, magnesium, copper, manganese, nickel, cobalt, sodium, potassium, lithium, and combinations of two or more thereof; and
   forming an outer layer about an outer surface of the adhesion promoting coating, the outer layer comprising at least one ionomer.

6. The method of claim 5, wherein the adhesion promoting coating contains about 15 wt % to about 30 wt % solids.

7. The method of claim 5, wherein the total amount of neutralizing agent included in the adhesion promoting coating is from about 1.50 pbw to about 5.50 pbw.

8. The method of claim 5, wherein from 10% to 40% of the acid groups of the acid copolymer are neutralized.

* * * * *